May 25, 1965  L. S. McKEY  3,184,890
PLANTING POT
Filed Oct. 3, 1963
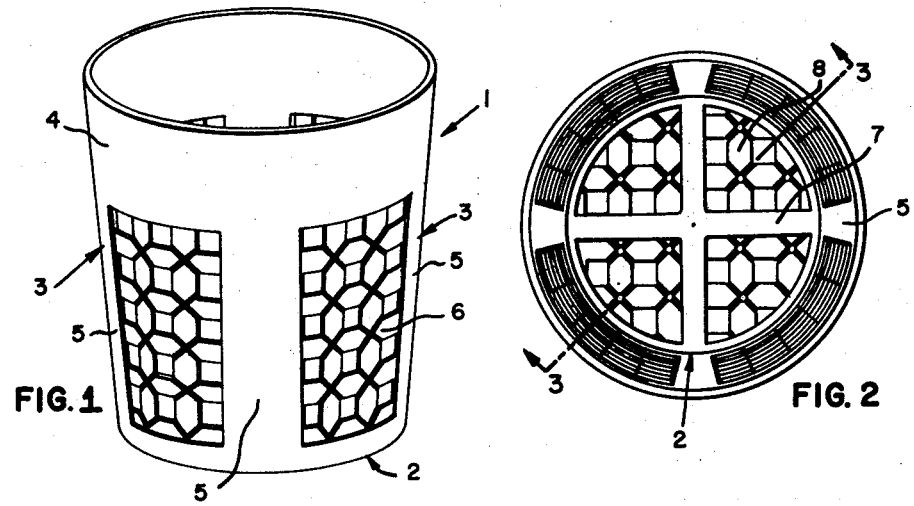
FIG. 1
FIG. 2
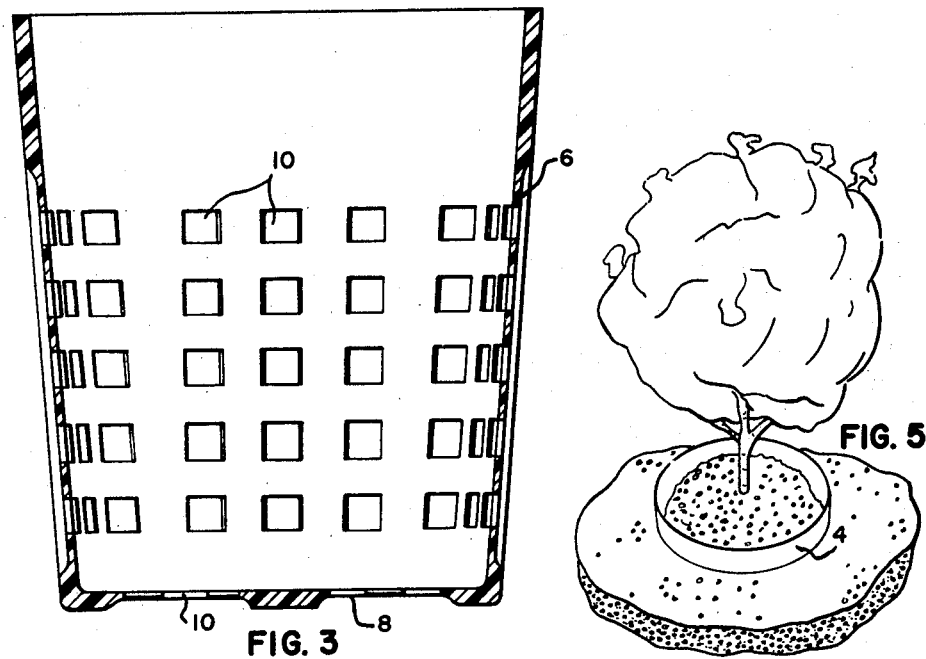
FIG. 3
FIG. 5
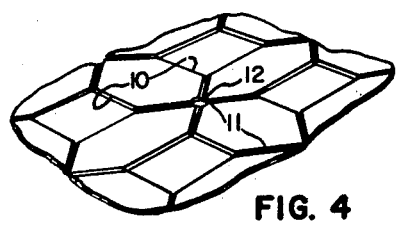
FIG. 4
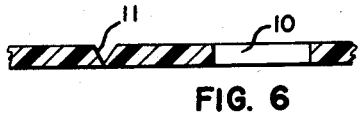
FIG. 6
INVENTOR.
LEO S. McKEY
BY
*Gordon Wood*
ATTORNEY United States Patent Office 3,184,890
Patented May 25, 1965

3,184,890
PLANTING POT
Leo S. McKey, 1965 23rd Ave., San Francisco 16, Calif.
Filed Oct. 3, 1963, Ser. No. 313,542
4 Claims. (Cl. 47—37)

This invention relates to a planting pot and more particularly to a container adapted to receive a young plant therein and which may be set in the ground with the young plant so as to protect the plant from burrowing animals such as moles and gophers during the early stages of the plant's life.

It is well known that moles and gophers and other burrowing animals are more inclined to attack the roots of young and tender plants than the roots of older plants whose growth has been established.

The main purpose of the present invention is the provision of a planting pot in which a new plant may be grown in a nursery, subsequently sold to the purchaser, and then planted by the purchaser in the ground without requiring the removal of the plant from the planting pot. The pot is designed so as to prevent access of burrowing animals to the roots during the early stages of the plant's life and at the same time not to interfere with the normal growth of the plant.

Another object of the invention is the provision of a planting pot that is light in weight, attractive in appearance, and very readily handled by nursery personnel and by the customer, and which may be planted with the plant without the necessity of removing the plant and its soil from the pot.

Another object of the invention is the provision of a plant pot which is extremely inexpensive to manufacture so that it may be given to the customer with the plant without unreasonably increasing the cost of the plant.

At present a commonplace method of merchandising young plants involves the use of a steel can which is filled with soil and in which the plant grows while it is in the nursery and before it is sold to the customer. In such a case the steel can must be cut open along its sidewalls before the plant and its soil may be planted in the ground by the customer and this procedure is a hazardous one, quite often resulting in injury in the form of cuts sustained by the customer. Furthermore, the problem of disposing of the mutilated steel can becomes a nuisance for most people. By the present invention no bothersome transplanting steps are involved and, furthermore, the plant pot itself provides a means for retaining water and fertilizer which may be provided for the plant after the same has been planted. This latter function is, of course, not possible with steel cans which must be removed before the plant is planted.

Another object of the invention is the provision of a plant pot that assists the gardener in planting the plant at a proper level which is important in the case of many types of plants.

Still another object of the invention is the provision of a plant pot that may be molded of polyethylene plastic or the like so as to be sturdy enough to hold the plant and its soil while the same are in the nursery and which provides an effective means for carrying the plant as well as protecting it from burrowing rodents after the plant has been planted.

Other objects and advantages will be apparent from the following specification and from the drawings wherein:

FIG. 1 is a perspective of a plant pot constructed in accordance with the present invention.

FIG. 2 is a bottom plan view of the plant pot of FIG. 1.

FIG. 3 is a greatly enlarged vertical cross section of the plant pot as taken in the plane indicated by lines 3—3 of FIG. 2.

FIG. 4 is a greatly enlarged fragmentary perspective of a portion of the thin section of the plant pot of FIG. 1 showing the manner in which the apertures are connected by lines of weakness.

FIG. 5 is a reduced perspective of the plant pot showing the same planted in the ground.

FIG. 6 is a cross section through one of the grooves.

In detail, and first with reference to FIG. 1, the invention comprises a container generally designated 1 which is preferably molded of polyethylene or other suitable plastic having like characteristics. The pot includes a bottom wall generally designated 2 and generally frusto-conical sidewalls generally designated 3 extending upwardly from said bottom wall.

The sidewalls 3 include an upper marginal portion 4 which is imperforate and which is adapted to project above the level of the soil when the pot is planted with the plant as best seen in FIG. 5.

The preferred form of the invention includes a plurality of vertically extending rectangular sections 5 extending between the upper portion of the pot and the bottom 2. Said sections 5 are relatively heavy in thickness compared to intermediate sections 6 which are reduced in thickness for a purpose to be described. Similarly, the bottom 2 is provided with diametrally extending ribs 7 which are relatively thick compared with the intermediate segment-shaped sections 8 (FIG. 2) and which connect with the heavy sections 5.

As best seen in FIG. 3, the thin sections 6, 8 are provided with rectangular apertures 10 which are equally spaced apart and preferably in parallel rows. These apertures 10 permit the roots of the plant to grow therethrough after the plant pot with the plant therein has been embedded in the soil. Naturally, the size of said apertures 10 is small enough so as to prevent access to the roots of the plant by burrowing animals such as moles and gophers.

In order to permit the plant to grow to its normal extent means is provided for permitting the apertures 10 to be enlarged by the roots as the roots grow without damage to such roots. This means takes the form of lines of weakness formed in sections 6, 8 of the plant pot, and which lines of weakness permit the material of the pot to tear when very little stress is imposed on the same. As best seen in FIG. 4, such lines of weakness preferably take the form of deep V-shaped grooves 11 which extend diagonally between diagonally spaced apertures 10. To facilitate the breaking up of the thin sections 6 and 8 a hole 12 may be formed in the plastic material at the intersection between the grooves 11.

It will be apparent that the present invention contemplates various other forms of apertures and lines of weakness and the particular arrangement shown in FIG. 4 is merely exemplary of one that permits a break-up of the pot material without too much effort by the plant roots. With the combination of apertures and lines of weakness as shown in FIG. 4 it will be apparent that the deflection of the material from its original plane need not be very great to permit a large increase in the diameter of the root that happens to be growing through the particular aperture involved. It will be apparent, however, that the lines of weakness need not necessarily extend diagonally.

As seen in FIG. 5 it will be apparent that the upper imperforate marginal portion 4 of the pot provides a receptacle for receiving water, fertilizer, straw, leaves and other material which may be employed to further the growth of the plant depending on the particular plant involved and the climate in which it is growing.

It will be apparent that the above described invention achieves all of the advanages of a rigid plant container made of steel and the like and at the same time achieves the advantages of those plant pots formed of disintegratable material which do not protect the plant properly from physical damage while it is being grown in the nursery.

The upper imperforate marginal portion 4 also provides a means for saving water and fertilizer since water and liquid fertilizer applied within said marginal portion will not flow laterally but will sink to the roots.

The various specific descriptions given above of the preferred form of the invention should not be taken as restrictive since it will be apparent that minor variations in design may be resorted to by those skilled in the art without departing from the scope of the following claims.

I claim:

1. A container for a plant adapted to be placed in the soil to prevent injury to the roots of such plant by burrowing animals, said container comprising:
   a generally frusto-conical pot formed of plastic and including a circular bottom wall and frusto-conical sidewalls extending upwardly from said bottom wall,
   said bottom wall and said sidewalls being formed with relatively thin spaced apart sections integral with the remainder of said walls,
   said sections being formed with spaced apart rectangular apertures joined by lines of weakness permitting enlargement of said apertures by growth of roots extending through said apertures.

2. A container according to claim 1 wherein said thin sections on said sidewalls are rectangular and elongated in a vertical direction with vertically extending rectangular thick sections interposed between said vertically extending sections.

3. A container according to claim 2 wherein said bottom wall is provided with diametrally extending relatively thick sections with thin segment-shaped sections interposed between said thick sections.

4. A planting pot formed of plastic material and comprising:
   a bottom wall,
   side walls extending upwardly from said bottom wall,
   a portion of said walls being formed with apertures adapted to permit the roots of such plant to extend therethrough,
   said portion being formed with lines of weakness extending to said apertures to permit failure of the material of said portion upon growth of said roots through said apertures,
   said apertures being formed to a configuration to provide corners, and said lines of weakness extending to said corners to facilitate enlargement of said apertures by the growth of such roots.

References Cited by the Examiner

UNITED STATES PATENTS

| | | | |
|---|---|---|---|
| 1,200,396 | 10/16 | Southard | 47—37 |
| 1,959,139 | 5/34 | Otwell | 47—37 |
| 2,810,234 | 10/57 | Blackburn et al. | 47—37 |
| 3,094,810 | 6/63 | Kalpin | 47—37 |

FOREIGN PATENTS 103,286  12/41  Sweden.

ANTONIO F. GUIDA, *Acting Primary Examiner.*

T. GRAHAM CRAVER, *Examiner.*